UNITED STATES PATENT OFFICE.

FRITZ KRÜGER AND GEORG TOBIAS, OF FÜRSTENBERG-ON-THE-ODER, AND EDUARD KEGEL, OF LEIPSIC, ASSIGNORS TO THE LEIPZIGER ANILIN FABRIK, BEYER & KEGEL, OF LINDENAU, GERMANY.

PRODUCTION OF COLORING-MATTERS FROM DINITRO-PHENOL.

SPECIFICATION forming part of Letters Patent No. 300,874, dated June 24, 1884.

Application filed July 30, 1883. (Specimens.)

*To all whom it may concern:*

Be it known that we, FRITZ KRÜGER and GEORG TOBIAS, both subjects of the King of Prussia, and residing at Fürstenberg-on-the-Oder, Germany, and EDUARD KEGEL, a subject of the King of Saxony, residing at Leipsic, Germany, have invented new and useful Improvements in Producing Coloring-Matters from Phenol, of which the following is a specification.

By boiling the mononitro-phenol-para-sulphorate of potash, which is obtained in the usual known way from phenol-para-sulphorate of potash, with diluted nitric acid; or, by boiling the phenol-para-sulphorate of potash with an excess of diluted nitric acid, until the evolution of gas ceases, a new body is obtained which dyes wool intensively yellow-red. The thus obtained new body is dinitro-phenol-para-sulphorate of potash.

Instead of the above-named potash-salts there may be employed every other salt of the above-named phenol-sulpho-acids, such as the soda, magnesia, lime, and other salts, and instead of the free nitric acid, mixtures of saltpeter and sulphuric acid may be employed. For examples, we proceed as follows:

First. Boil one hundred pounds mononitro-phenol-para-sulphorate of potash with a mixture of one hundred pounds saltpeter, one hundred pounds sulphuric acid, and fifty gallons of water until the evolution of gas ceases, filter hot, and get the dinitro-phenol-sulphorate of potash in crystals after cooling and filtering again; or, Second. Treat one hundred pounds phenol-para-sulphorate of potash with one hundred and sixty-eight pounds of saltpeter and two hundred pounds of sulphuric acid in fifty gallons of water in the above way.

Third. Treat one hundred pounds of the raw phenol-sulpho-acid (as it is got by heating, for example, seventy parts of carbolic acid and eighty parts of sulphuric acid, 66° Baumé, during twelve hours at 180° Fahrenheit) with two hundred and fifty pounds saltpeter and three hundred pounds sulphuric acid and fifty gallons of water until the evolution of gas ceases, in the same manner as described in No. 1. Instead of boiling with diluted nitric acid, a stronger nitric acid may be employed. In this case the operation must be treated some time at a low temperature and only heated at the end to finish the reaction.

Fourth. Example: Add gradually one hundred pounds of phenol-sulphorate of potash to a mixture of two hundred pounds of nitric acid, 40° Baumé, and four hundred pounds of sulphuric acid 66° Baumé. Let it stand cool for twenty-four hours. Add then fifty gallons of water and raise the temperature gradually and slowly until the dinitro-phenol-sulpho-acid is formed. Add then five hundred pounds of soda-lye of 40° Baumé, and get the potash salt, as described in example No. 1. The dinitro-phenol-sulphorate of potash is transformed into the alkali-ammonia salt, which has a more valuable exterior. This is made by evaporation of the potash-salt with an excess of spirit of ammonia, and we proceed as follows:

Fifth. Mix one hundred pounds of the dinitro-phenol-sulphorate of potash, as obtained in the manner described in examples 1 to 4, with thirty pounds of spirit of ammonia of 0.910 specific gravity, and evaporate on the water-back to dryness. The thus resulting red product ground is the commercial product as sold.

Having thus described and ascertained the nature of our invention and the manner in which the same is to be performed, we desire it to be understood that what we claim as our invention, and desire to secure by Letters Patent, is—

The herein-described process in the production of dinitro-phenol-sulpho-acid and its salts, by means of nitrating phenol-sulpho-acid or mononitro-phenol-sulpho-acid or their salts, substantially as set forth.

FRITZ KRÜGER.
G. TOBIAS.
EDUARD KEGEL.

Witnesses:
HERM. LEITERT,
OSW. SCHMIDT.